(No Model.)

E. GARRIGUES.
UNIVERSAL JOINT.

No. 252,208. Patented Jan. 10, 1882.

WITNESSES:
C. Neveux
C. Sedgwick

INVENTOR:
E. Garrigues
BY Munn & Co.
ATTORNEYS.

UNITED STATES PATENT OFFICE.

EDMUND GARRIGUES, OF MASSILLON, OHIO.

UNIVERSAL JOINT.

SPECIFICATION forming part of Letters Patent No. 252,208, dated January 10, 1882.

Application filed December 8, 1881. (No model.)

*To all whom it may concern:*

Be it known that I, EDMUND GARRIGUES, of Massillon, in the county of Stark and State of Ohio, have invented a useful Improvement in Universal Joints, of which the following is a full, clear, and exact description.

My invention consists principally of a universal-shaft connection, joint, or coupling, the ball of which is formed with an oil-chamber, of casting the yokes upon the ball, of the method of casting the ball and yokes whereby the journals and bearings of the coupling will be chilled, and of a chilled ball, in combination with the yokes having chilled gudgeons or bearings.

Reference is to be had to the accompanying drawings, forming part of this specification, in which similar letters of reference indicate corresponding parts in all the figures.

Figure 1:
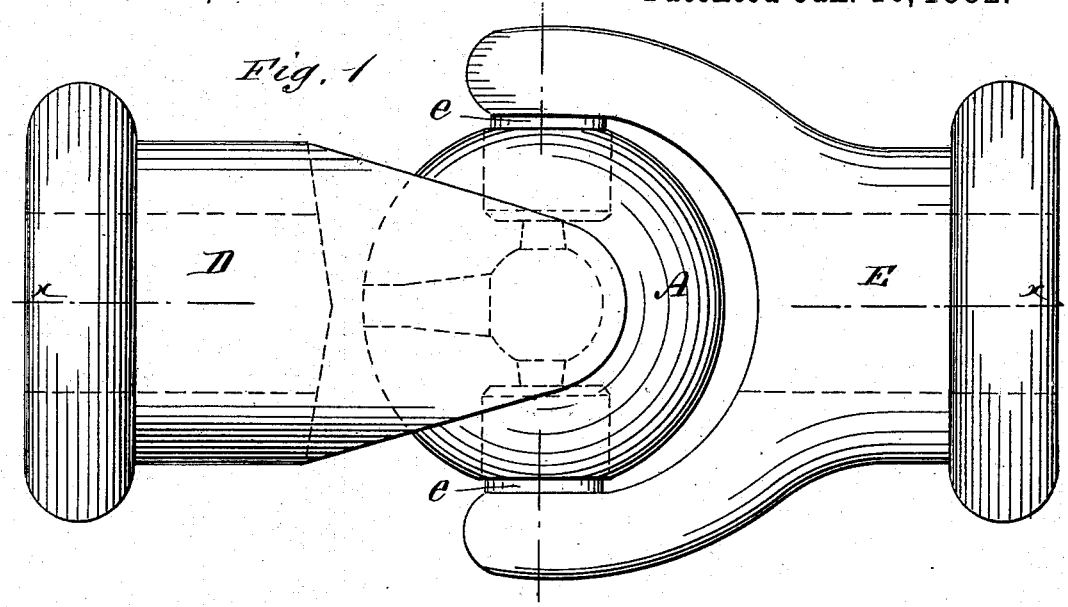
Figure 2:
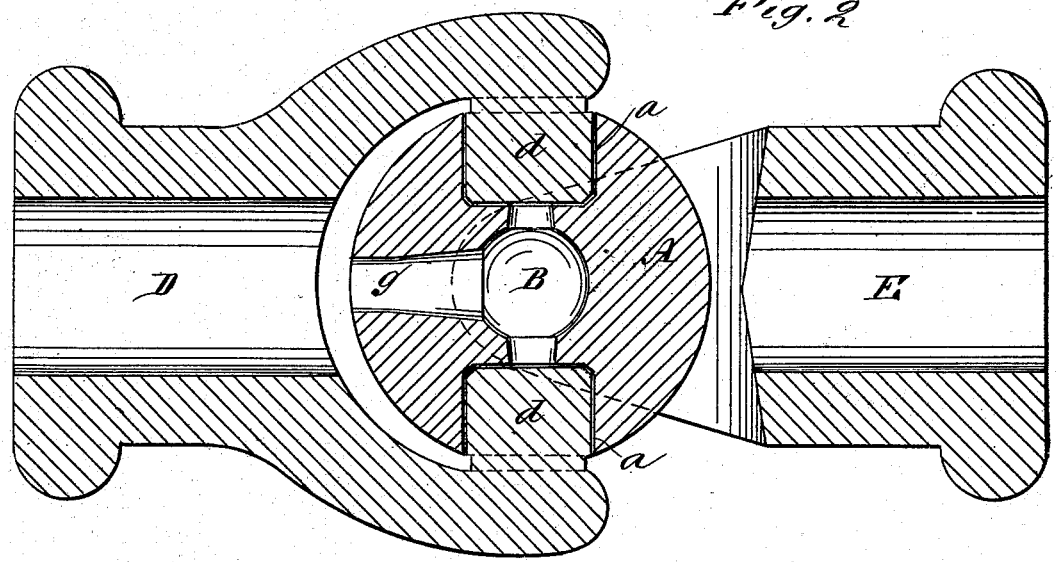

Figure 1 is a plan view of my improved joint or coupling. Fig. 2 is a sectional elevation taken on the line $x\,x$ of Fig. 1, and Fig. 3 is a sectional elevation taken through the center of the ball.

In making my improved joint or shaft coupling, the ball A is first cast, using chills in the molds for forming the four journals $a$ and a sand-core for forming the central oil-chamber B. A mold is then formed up around the ball for casting the yokes D and E, and this is done in such manner that when the metal is poured the journals $a$ serve as chills for casting the bearings $d$ and $e$ of the yokes. In this manner the coupling is made complete by two castings, and the journals and bearings are of chilled metal. The natural shrinkage of the metal will reduce the diameter of the bearings $d$ and $e$ sufficiently to make sufficient play for the easy and proper working of the coupling.

Figure 3:
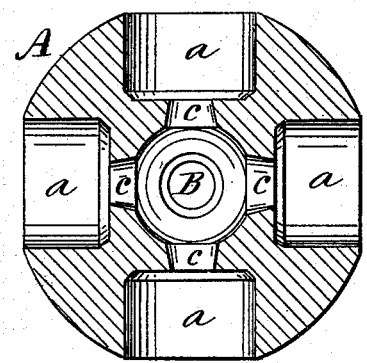

The oil-chamber B communicates with the journals $a$ through the openings $c$, and is formed with the inlet-opening $g$, as clearly shown in Figs. 2 and 3.

The openings $c$ are preferably formed by means of small projections formed on the ends of the chills used in casting the ball, which projections reach into the sand-core of the oil-chamber.

Having thus fully described my invention, I claim as new and desire to secure by Letters Patent—

1. In a universal joint or coupling, the ball A, formed with the oil-chamber B, communicating with the bearings of the joint, substantially as shown and described.

2. The universal joint or coupling, formed by casting the yokes D and E upon the ball A, substantially as described.

3. The method herein described, of forming the universal coupling, consisting in first casting the ball, using chills for the journals, and then casting the yokes upon the ball in such manner that the journals act as chills for forming the bearings of the yokes, substantially as set forth.

4. The chilled ball A, in combination with the yokes D and E, having the chilled bearings $d$ and $e$, substantially as described.

EDMUND GARRIGUES.

Witnesses:
EDWARD H. GARRIGUES,
WILLIAM H. ALLMAN.